US010628068B2

(12) United States Patent
Gopal et al.

(10) Patent No.: US 10,628,068 B2
(45) Date of Patent: Apr. 21, 2020

(54) TECHNOLOGIES FOR BIG DATA ANALYTICS ACCELERATOR

(71) Applicant: Intel Corporation, Santa Clara, CA (US)

(72) Inventors: Vinodh Gopal, Westborough, MA (US); James D. Guilford, Northborough, MA (US); Kirk S. Yap, Westborough, MA (US); Simon N. Peffers, Acton, MA (US); Daniel F. Cutter, Maynard, MA (US)

(73) Assignee: Intel Corporation, Santa Clara, CA (US)

( * ) Notice: Subject to any disclaimer, the term of this patent is extended or adjusted under 35 U.S.C. 154(b) by 258 days.

(21) Appl. No.: 15/719,774

(22) Filed: Sep. 29, 2017

(65) Prior Publication Data
US 2018/0150471 A1 May 31, 2018

Related U.S. Application Data

(60) Provisional application No. 62/427,268, filed on Nov. 29, 2016.

(30) Foreign Application Priority Data

Nov. 29, 2016 (IN) .............................. 201741030632

(51) Int. Cl.
*G06F 3/06* (2006.01)
*G06F 7/06* (2006.01)
(Continued)

(52) U.S. Cl.
CPC .......... *G06F 3/0641* (2013.01); *G06F 3/0604* (2013.01); *G06F 3/065* (2013.01);
(Continued)

(58) Field of Classification Search
CPC ........ G06F 21/554; G06F 21/64; G06F 21/78; G06F 9/30036; G06F 9/30021;
(Continued)

(56) References Cited

U.S. PATENT DOCUMENTS

2010/0322089 A1* 12/2010 Raja .................... H04L 41/5009
370/252
2013/0262809 A1* 10/2013 Wegener ................ G06F 12/08
711/165

(Continued)

OTHER PUBLICATIONS

Extended European search report for EP application No. 18191344.3, dated Sep. 28, 2018.

(Continued)

*Primary Examiner* — Evan Aspinwall
(74) *Attorney, Agent, or Firm* — Barnes & Thornburg LLP

(57) ABSTRACT

Technologies for database acceleration include a computing device having a database accelerator. The database accelerator performs a decompress operation on one or more compressed elements of a compressed database to generate one or more decompressed elements. After decompression of the compressed elements, the database accelerator prepares the one or more decompressed elements to generate one or more prepared elements to be processed by an accelerated filter. The database accelerator then performs the accelerated filter on the one or more prepared elements to generate one or more output elements. Other embodiments are described and claimed.

25 Claims, 13 Drawing Sheets

(51) Int. Cl.
| | |
|---|---|
| G06F 16/174 | (2019.01) |
| G06F 21/57 | (2013.01) |
| G06F 21/73 | (2013.01) |
| G06F 8/65 | (2018.01) |
| H04L 12/24 | (2006.01) |
| H04L 29/08 | (2006.01) |
| G06F 11/30 | (2006.01) |
| G06F 9/50 | (2006.01) |
| H03M 7/30 | (2006.01) |
| H03M 7/40 | (2006.01) |
| H04L 12/26 | (2006.01) |
| H04L 12/813 | (2013.01) |
| H04L 12/851 | (2013.01) |
| G06F 11/07 | (2006.01) |
| G06F 11/34 | (2006.01) |
| G06T 9/00 | (2006.01) |
| H03M 7/42 | (2006.01) |
| H04L 12/28 | (2006.01) |
| H04L 12/46 | (2006.01) |
| H04L 29/12 | (2006.01) |
| G06F 13/16 | (2006.01) |
| G06F 21/62 | (2013.01) |
| G06F 21/76 | (2013.01) |
| H03K 19/173 | (2006.01) |
| H04L 9/08 | (2006.01) |
| H04L 12/933 | (2013.01) |
| G06F 9/38 | (2018.01) |
| G06F 9/48 | (2006.01) |
| G06F 12/02 | (2006.01) |
| G06F 12/06 | (2006.01) |
| G06T 1/20 | (2006.01) |
| G06T 1/60 | (2006.01) |
| G06F 9/54 | (2006.01) |
| G06F 8/656 | (2018.01) |
| G06F 8/658 | (2018.01) |
| G06F 8/654 | (2018.01) |
| G06F 9/4401 | (2018.01) |
| H01R 13/453 | (2006.01) |
| H01R 13/631 | (2006.01) |
| H05K 7/14 | (2006.01) |
| H04L 12/911 | (2013.01) |
| G06F 11/14 | (2006.01) |
| H04L 29/06 | (2006.01) |
| G06F 15/80 | (2006.01) |

(52) U.S. Cl.
CPC .............. *G06F 3/067* (2013.01); *G06F 3/0608* (2013.01); *G06F 3/0611* (2013.01); *G06F 3/0613* (2013.01); *G06F 3/0617* (2013.01); *G06F 3/0647* (2013.01); *G06F 3/0653* (2013.01); *G06F 7/06* (2013.01); *G06F 8/65* (2013.01); *G06F 8/654* (2018.02); *G06F 8/656* (2018.02); *G06F 8/658* (2018.02); *G06F 9/3851* (2013.01); *G06F 9/3891* (2013.01); *G06F 9/4401* (2013.01); *G06F 9/4881* (2013.01); *G06F 9/505* (2013.01); *G06F 9/5005* (2013.01); *G06F 9/5038* (2013.01); *G06F 9/544* (2013.01); *G06F 11/079* (2013.01); *G06F 11/0709* (2013.01); *G06F 11/0751* (2013.01); *G06F 11/3006* (2013.01); *G06F 11/3034* (2013.01); *G06F 11/3055* (2013.01); *G06F 11/3079* (2013.01); *G06F 11/3409* (2013.01); *G06F 12/0284* (2013.01); *G06F 12/0692* (2013.01); *G06F 13/1652* (2013.01); *G06F 16/1744* (2019.01); *G06F 21/57* (2013.01); *G06F 21/6218* (2013.01); *G06F 21/73* (2013.01); *G06F 21/76* (2013.01); *G06T 1/20* (2013.01); *G06T 1/60* (2013.01); *G06T 9/005* (2013.01); *H01R 13/4538* (2013.01); *H01R 13/631* (2013.01); *H03K 19/1731* (2013.01); *H03M 7/3084* (2013.01); *H03M 7/40* (2013.01); *H03M 7/42* (2013.01); *H03M 7/60* (2013.01); *H03M 7/6011* (2013.01); *H03M 7/6017* (2013.01); *H03M 7/6029* (2013.01); *H04L 9/0822* (2013.01); *H04L 12/2881* (2013.01); *H04L 12/4633* (2013.01); *H04L 41/044* (2013.01); *H04L 41/0816* (2013.01); *H04L 41/0853* (2013.01); *H04L 41/12* (2013.01); *H04L 43/04* (2013.01); *H04L 43/06* (2013.01); *H04L 43/08* (2013.01); *H04L 43/0894* (2013.01); *H04L 47/20* (2013.01); *H04L 47/2441* (2013.01); *H04L 49/104* (2013.01); *H04L 61/2007* (2013.01); *H04L 67/10* (2013.01); *H04L 67/1014* (2013.01); *H04L 67/327* (2013.01); *H04L 67/36* (2013.01); *H05K 7/1452* (2013.01); *H05K 7/1487* (2013.01); *G06F 11/1453* (2013.01); *G06F 12/023* (2013.01); *G06F 15/80* (2013.01); *G06F 2212/401* (2013.01); *G06F 2212/402* (2013.01); *G06F 2221/2107* (2013.01); *H04L 41/046* (2013.01); *H04L 41/0896* (2013.01); *H04L 41/142* (2013.01); *H04L 47/78* (2013.01); *H04L 63/1425* (2013.01)

(58) Field of Classification Search
CPC ............ G06F 9/30145; G06F 9/30109; G06F 9/30112; G06F 9/30029; G06F 9/3016; G06F 9/30018; G06F 16/90344; G06F 16/2237; G06F 2212/401; G06F 3/0641; G06F 8/656; G06F 8/658; G06F 8/654; G06F 16/1744; G06F 3/0604; G06F 3/0608; G06F 3/0611; G06F 3/0613; G06F 3/0617; G06F 3/0647; G06F 3/065; G06F 3/0653; G06F 3/067; G06F 7/06; G06F 8/65; G06F 9/3851; G06F 9/3891; G06F 9/4401; G06F 9/4881; G06F 9/5005; G06F 9/5038; G06F 9/505; G06F 9/544; G06F 11/0709; G06F 11/0751; G06F 11/079; G06F 11/3006; G06F 11/3034; G06F 11/3055; G06F 11/3079; G06F 11/3409; G06F 12/0284; G06F 12/0692; G06F 13/1652; G06F 21/57; G06F 51/6218; G06F 21/73; G06F 21/76; G06F 16/215; G06F 16/2365; G06F 16/221; G06T 1/20; G06T 1/60; G06T 9/005; H01R 13/4538; H01R 13/631; H03K 19/1731; H03M 7/3084; H03M 7/40; H03M 7/42; H03M 7/60; H03M 7/6011; H03M 7/6017; H03M 7/6029; H04L 9/0822; H04L 12/2881; H04L 12/4633; H04L 43/04; H04L 43/06; H04L 43/08; H04L 43/0894; H04L 47/20; H04L 47/2441; H04L 49/104; H04L 61/2007; H04L 67/10; H04L 67/1014; H04L 67/327; H04L 67/36; H05K 7/1452; H05K 7/1487
USPC ...................................................... 707/693
See application file for complete search history.

(56) References Cited

U.S. PATENT DOCUMENTS

| | | | | |
|---|---|---|---|---|
| 2014/0032516 A1* | 1/2014 | Sukhwani | ............ | H03M 7/3088 |
| | | | | 707/705 |
| 2015/0032763 A1 | 1/2015 | Marwah | | |
| 2016/0378808 A1* | 12/2016 | Hopcroft | ............. | G06F 16/2237 |
| | | | | 707/745 |
| 2018/0052766 A1* | 2/2018 | Mehra | ................... | G06F 3/0625 |

OTHER PUBLICATIONS

Zhiyuan Chen et al: "Query optimization in compressed database systems", SIGMOD Record, ACM, New York, NY, US, vol. 30, No. 2, May 1, 2001 (May 1, 2001), pp. 271-282.

* cited by examiner

TECHNOLOGIES FOR BIG DATA ANALYTICS ACCELERATOR

CROSS-REFERENCE TO RELATED APPLICATIONS

The present application claims the benefit of U.S. Provisional Patent Application No. 62/427,268, filed Nov. 29, 2016 and Indian Provisional Patent Application No. 201741030632, filed Aug. 30, 2017.

BACKGROUND

Modern computing devices may include general-purpose processor cores as well as a variety of hardware accelerators for performing specialized tasks. Certain computing devices may include one or more accelerators embodied as field-programmable gate arrays (FPGAs), which may include programmable digital logic resources that may be configured by the end user or system integrator.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
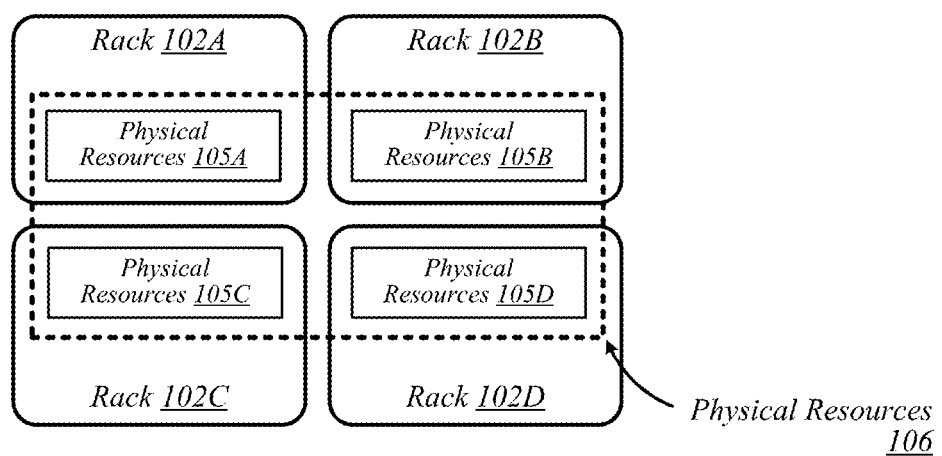
FIG. 1 is a diagram of a conceptual overview of a data center in which one or more techniques described herein may be implemented according to various embodiments.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

FIG. 1 illustrates a conceptual overview of a data center 100 that may generally be representative of a data center or other type of computing network in/for which one or more techniques described herein may be implemented according to various embodiments. As shown in FIG. 1, data center 100 may generally contain a plurality of racks, each of which may house computing equipment comprising a respective set of physical resources. In the particular non-limiting example depicted in FIG. 1, data center 100 contains four racks 102A to 102D, which house computing equipment comprising respective sets of physical resources 105A to 105D. According to this example, a collective set of physical resources 106 of data center 100 includes the various sets of physical resources 105A to 105D that are distributed among racks 102A to 102D. Physical resources 106 may include resources of multiple types, such as—for example—processors, co-processors, accelerators, field-programmable gate arrays (FPGAs), memory, and storage. The embodiments are not limited to these examples.

The illustrative data center 100 differs from typical data centers in many ways. For example, in the illustrative embodiment, the circuit boards ("sleds") on which components such as CPUs, memory, and other components are placed are designed for increased thermal performance In particular, in the illustrative embodiment, the sleds are shallower than typical boards. In other words, the sleds are shorter from the front to the back, where cooling fans are located. This decreases the length of the path that air must to travel across the components on the board. Further, the components on the sled are spaced further apart than in typical circuit boards, and the components are arranged to reduce or eliminate shadowing (i.e., one component in the air flow path of another component). In the illustrative embodiment, processing components such as the processors are located on a top side of a sled while near memory, such as dual inline memory modules (DIMMs), are located on a bottom side of the sled. As a result of the enhanced airflow provided by this design, the components may operate at higher frequencies and power levels than in typical systems, thereby increasing performance Furthermore, the sleds are configured to blindly mate with power and data communication cables in each rack 102A, 102B, 102C, 102D, enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

Furthermore, in the illustrative embodiment, the data center 100 utilizes a single network architecture ("fabric") that supports multiple other network architectures including Ethernet and Omni-Path. The sleds, in the illustrative embodiment, are coupled to switches via optical fibers, which provide higher bandwidth and lower latency than typical twisted pair cabling (e.g., Category 5, Category 5e, Category 6, etc.). Due to the high bandwidth, low latency interconnections and network architecture, the data center 100 may, in use, pool resources, such as memory, accelerators (e.g., graphics accelerators, FPGAs, application-specific integrated circuits (ASICs), etc.), and data storage drives that are physically disaggregated, and provide them to compute resources (e.g., processors) on an as needed basis, enabling the compute resources to access the pooled resources as if they were local. The illustrative data center 100 additionally receives usage information for the various resources, predicts resource usage for different types of workloads based on past resource usage, and dynamically reallocates the resources based on this information.

The racks 102A, 102B, 102C, 102D of the data center 100 may include physical design features that facilitate the automation of a variety of types of maintenance tasks. For example, data center 100 may be implemented using racks that are designed to be robotically-accessed, and to accept and house robotically-manipulatable resource sleds. Furthermore, in the illustrative embodiment, the racks 102A, 102B, 102C, 102D include integrated power sources that receive a greater voltage than is typical for power sources. The increased voltage enables the power sources to provide additional power to the components on each sled, enabling the components to operate at higher than typical frequencies.

Figure 2:
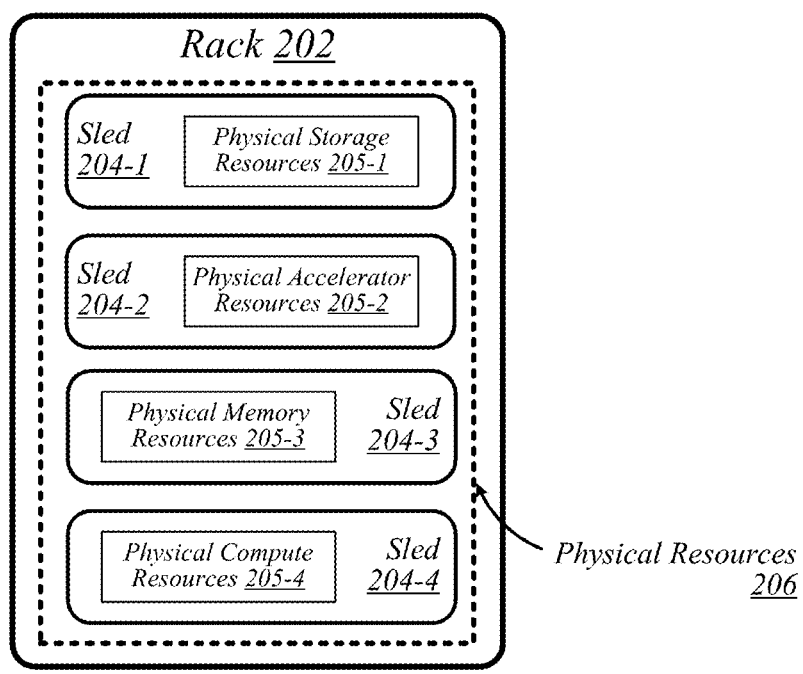
FIG. 2 is a diagram of an example embodiment of a logical configuration of a rack of the data center of FIG. 1.

FIG. 2 illustrates an exemplary logical configuration of a rack 202 of the data center 100. As shown in FIG. 2, rack 202 may generally house a plurality of sleds, each of which may comprise a respective set of physical resources. In the particular non-limiting example depicted in FIG. 2, rack 202 houses sleds 204-1 to 204-4 comprising respective sets of physical resources 205-1 to 205-4, each of which constitutes a portion of the collective set of physical resources 206 comprised in rack 202. With respect to FIG. 1, if rack 202 is representative of—for example—rack 102A, then physical resources 206 may correspond to the physical resources 105A comprised in rack 102A. In the context of this example, physical resources 105A may thus be made up of the respective sets of physical resources, including physical storage resources 205-1, physical accelerator resources 205-2, physical memory resources 205-3, and physical compute resources 205-5 comprised in the sleds 204-1 to 204-4 of rack 202. The embodiments are not limited to this example. Each sled may contain a pool of each of the various types of physical resources (e.g., compute, memory, accelerator, storage). By having robotically accessible and robotically manipulatable sleds comprising disaggregated resources, each type of resource can be upgraded independently of each other and at their own optimized refresh rate.

Figure 3:
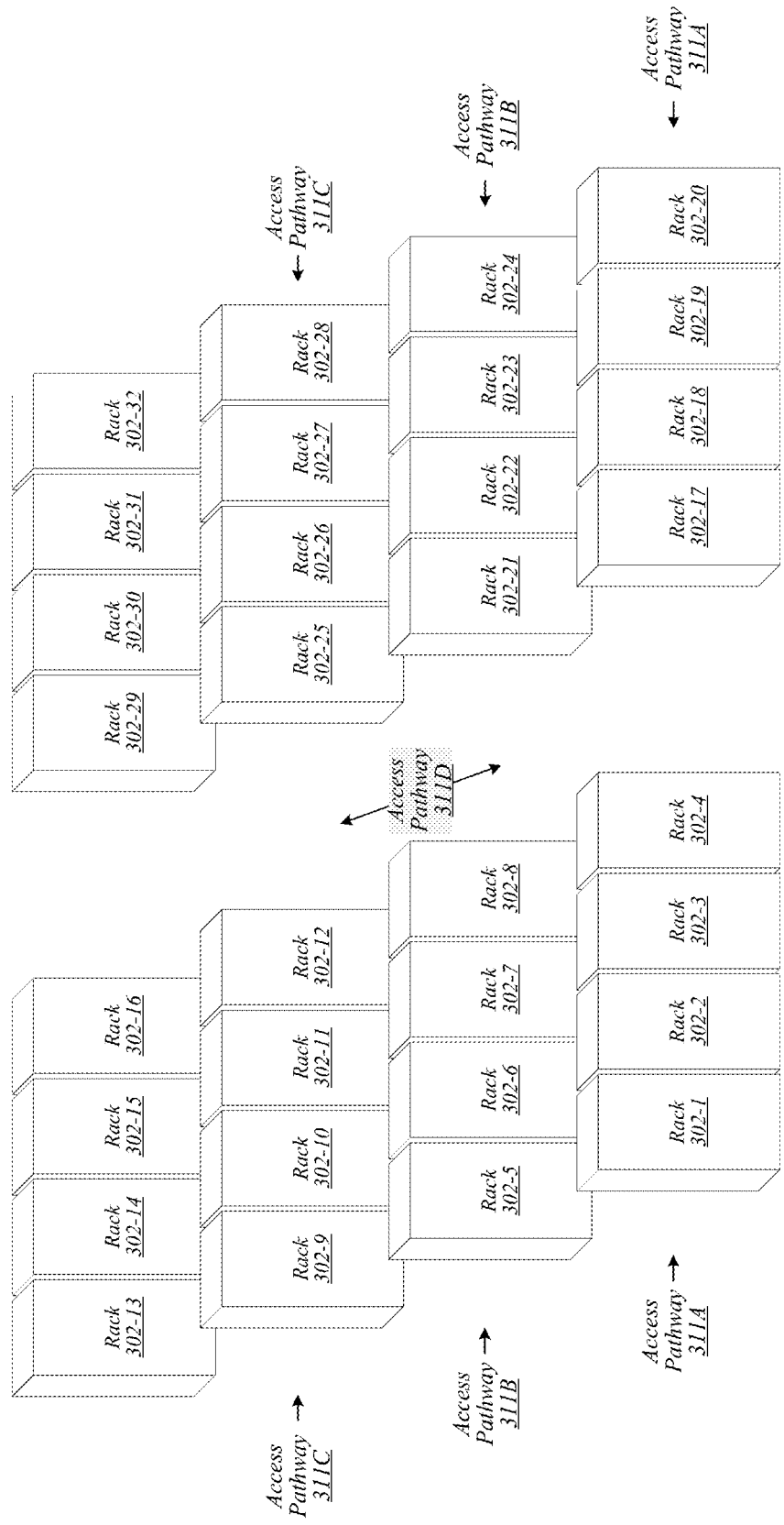
FIG. 3 is a diagram of an example embodiment of another data center in which one or more techniques described herein may be implemented according to various embodiments.

FIG. 3 illustrates an example of a data center 300 that may generally be representative of one in/for which one or more techniques described herein may be implemented according to various embodiments. In the particular non-limiting example depicted in FIG. 3, data center 300 comprises racks 302-1 to 302-32. In various embodiments, the racks of data center 300 may be arranged in such fashion as to define and/or accommodate various access pathways. For example, as shown in FIG. 3, the racks of data center 300 may be arranged in such fashion as to define and/or accommodate access pathways 311A, 311B, 311C, and 311D. In some embodiments, the presence of such access pathways may generally enable automated maintenance equipment, such as robotic maintenance equipment, to physically access the computing equipment housed in the various racks of data center 300 and perform automated maintenance tasks (e.g., replace a failed sled, upgrade a sled). In various embodiments, the dimensions of access pathways 311A, 311B, 311C, and 311D, the dimensions of racks 302-1 to 302-32, and/or one or more other aspects of the physical layout of data center 300 may be selected to facilitate such automated operations. The embodiments are not limited in this context.

Figure 4:
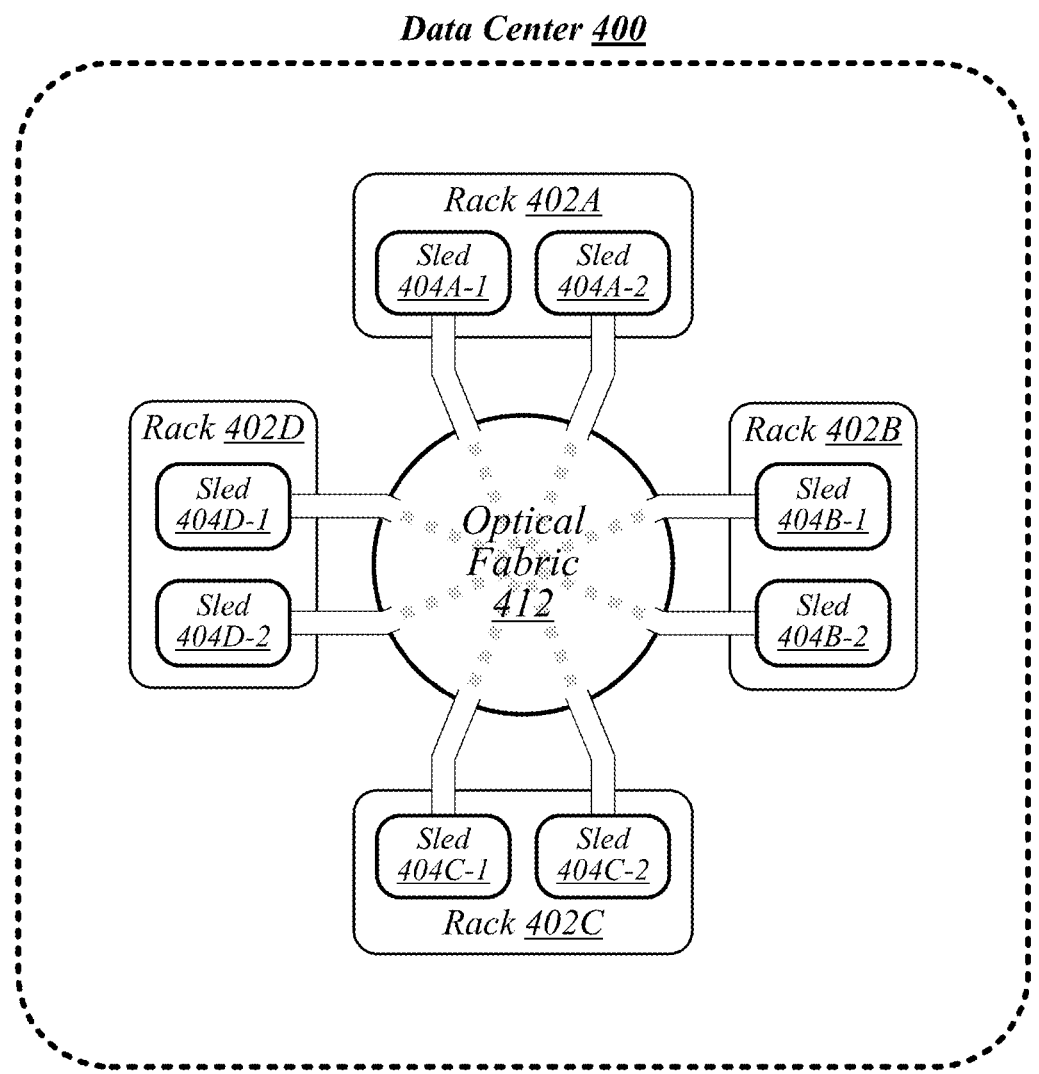
FIG. 4 is a diagram of another example embodiment of a data center in which one or more techniques described herein may be implemented according to various embodiments.

FIG. 4 illustrates an example of a data center 400 that may generally be representative of one in/for which one or more techniques described herein may be implemented according to various embodiments. As shown in FIG. 4, data center 400 may feature an optical fabric 412. Optical fabric 412 may generally comprise a combination of optical signaling media (such as optical cabling) and optical switching infrastructure via which any particular sled in data center 400 can send signals to (and receive signals from) each of the other sleds in data center 400. The signaling connectivity that optical fabric 412 provides to any given sled may include connectivity both to other sleds in a same rack and sleds in other racks. In the particular non-limiting example depicted in FIG. 4, data center 400 includes four racks 402A to 402D.

Racks 402A to 402D house respective pairs of sleds 404A-1 and 404A-2, 404B-1 and 404B-2, 404C-1 and 404C-2, and 404D-1 and 404D-2. Thus, in this example, data center 400 comprises a total of eight sleds. Via optical fabric 412, each such sled may possess signaling connectivity with each of the seven other sleds in data center 400. For example, via optical fabric 412, sled 404A-1 in rack 402A may possess signaling connectivity with sled 404A-2 in rack 402A, as well as the six other sleds 404B-1, 404B-2, 404C-1, 404C-2, 404D-1, and 404D-2 that are distributed among the other racks 402B, 402C, and 402D of data center 400. The embodiments are not limited to this example.

Figure 5:
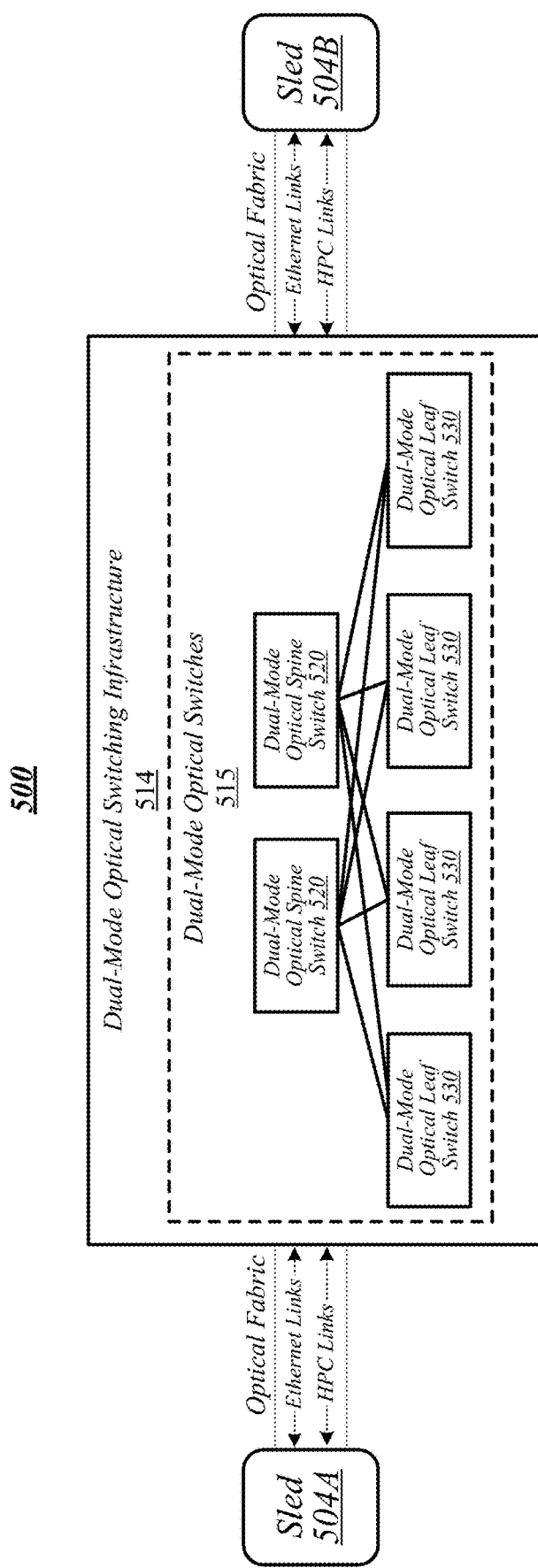
FIG. 5 is a diagram of a connectivity scheme representative of link-layer connectivity that may be established among various sleds of the data centers of FIGS. 1, 3, and 4.

FIG. 5 illustrates an overview of a connectivity scheme 500 that may generally be representative of link-layer connectivity that may be established in some embodiments among the various sleds of a data center, such as any of example data centers 100, 300, and 400 of FIGS. 1, 3, and 4. Connectivity scheme 500 may be implemented using an optical fabric that features a dual-mode optical switching infrastructure 514. Dual-mode optical switching infrastructure 514 may generally comprise a switching infrastructure that is capable of receiving communications according to multiple link-layer protocols via a same unified set of optical signaling media, and properly switching such communications. In various embodiments, dual-mode optical switching infrastructure 514 may be implemented using one or more dual-mode optical switches 515. In various embodiments, dual-mode optical switches 515 may generally comprise high-radix switches. In some embodiments, dual-mode optical switches 515 may comprise multi-ply switches, such as four-ply switches. In various embodiments, dual-mode optical switches 515 may feature integrated silicon photonics that enable them to switch communications with significantly reduced latency in comparison to conventional switching devices. In some embodiments, dual-mode optical switches 515 may constitute leaf switches 530 in a leaf-spine architecture additionally including one or more dual-mode optical spine switches 520.

In various embodiments, dual-mode optical switches may be capable of receiving both Ethernet protocol communications carrying Internet Protocol (IP packets) and communications according to a second, high-performance computing (HPC) link-layer protocol (e.g., Intel's Omni-Path Architecture's, Infiniband) via optical signaling media of an optical fabric. As reflected in FIG. 5, with respect to any particular pair of sleds 504A and 504B possessing optical signaling connectivity to the optical fabric, connectivity scheme 500 may thus provide support for link-layer connectivity via both Ethernet links and HPC links. Thus, both Ethernet and HPC communications can be supported by a single high-bandwidth, low-latency switch fabric. The embodiments are not limited to this example.

Figure 6:
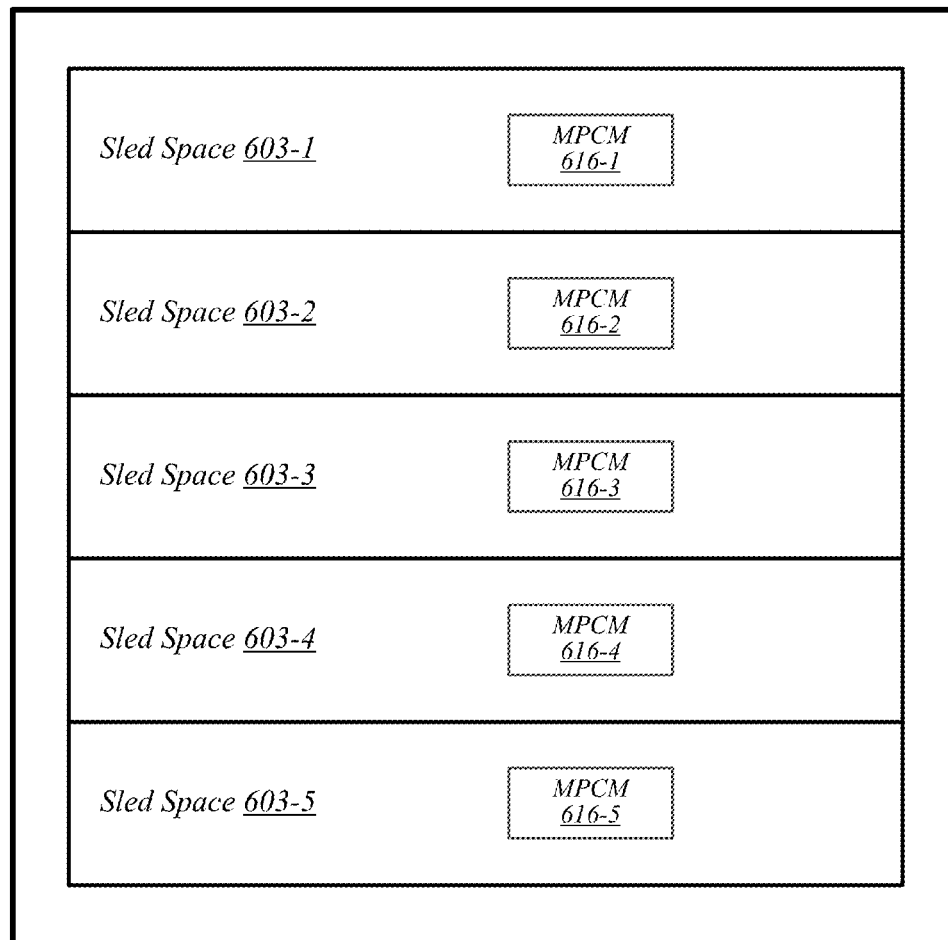
FIG. 6 is a diagram of a rack architecture that may be representative of an architecture of any particular one of the racks depicted in FIGS. 1-4 according to some embodiments.

FIG. 6 illustrates a general overview of a rack architecture 600 that may be representative of an architecture of any particular one of the racks depicted in FIGS. 1 to 4 according to some embodiments. As reflected in FIG. 6, rack architecture 600 may generally feature a plurality of sled spaces into which sleds may be inserted, each of which may be robotically-accessible via a rack access region 601. In the particular non-limiting example depicted in FIG. 6, rack architecture 600 features five sled spaces 603-1 to 603-5. Sled spaces 603-1 to 603-5 feature respective multi-purpose connector modules (MPCMs) 616-1 to 616-5.

Figure 7:
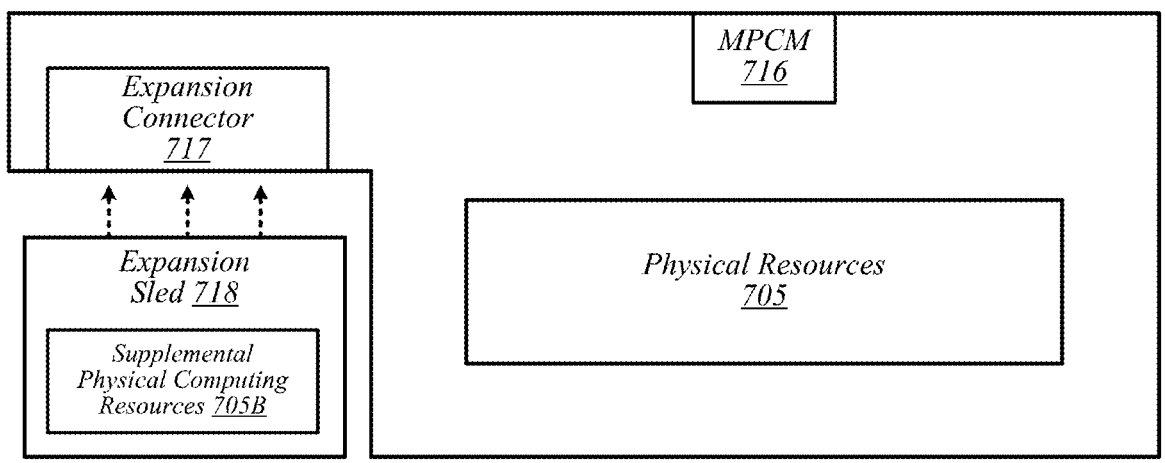
FIG. 7 is a diagram of an example embodiment of a sled that may be used with the rack architecture of FIG. 6.

FIG. 7 illustrates an example of a sled 704 that may be representative of a sled of such a type. As shown in FIG. 7, sled 704 may comprise a set of physical resources 705, as well as an MPCM 716 designed to couple with a counterpart MPCM when sled 704 is inserted into a sled space such as any of sled spaces 603-1 to 603-5 of FIG. 6. Sled 704 may also feature an expansion connector 717. Expansion connector 717 may generally comprise a socket, slot, or other type of connection element that is capable of accepting one or more types of expansion modules, such as an expansion sled 718. By coupling with a counterpart connector on expansion sled 718, expansion connector 717 may provide physical resources 705 with access to supplemental computing resources 705B residing on expansion sled 718. The embodiments are not limited in this context.

Figure 8:
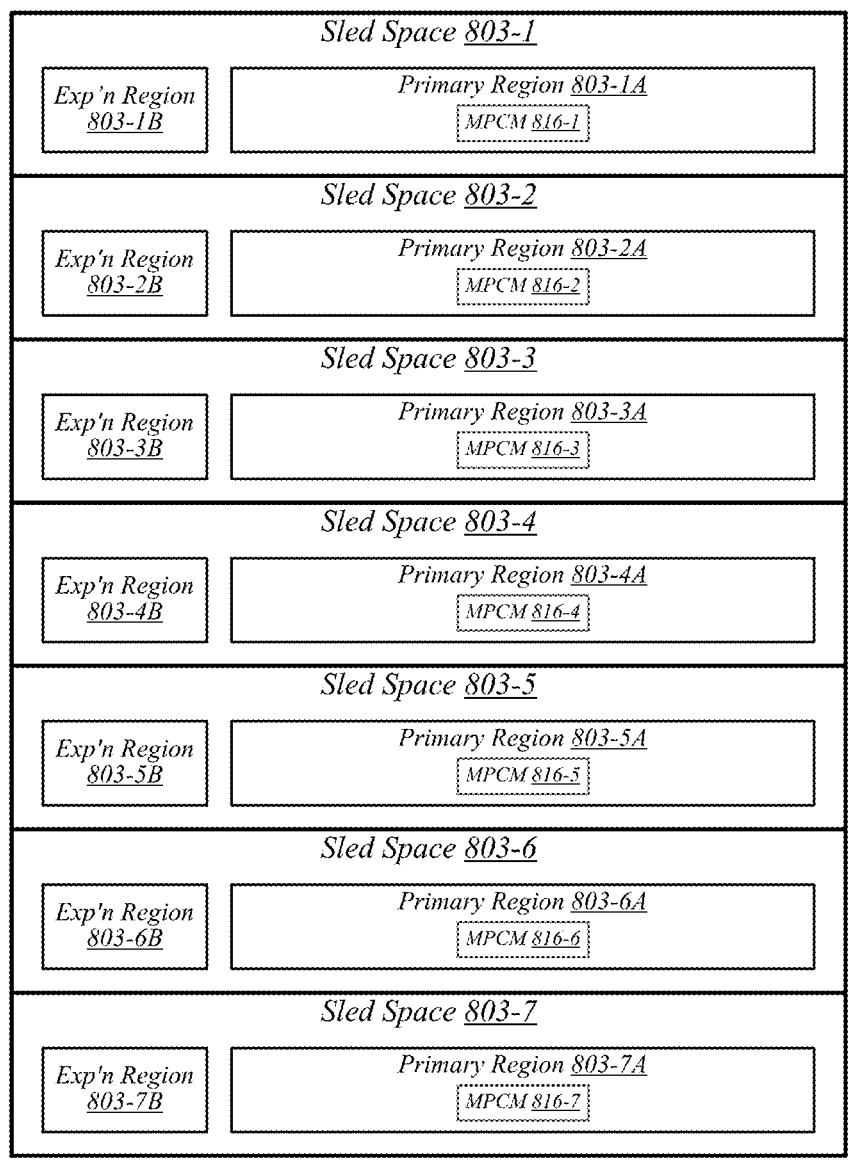
FIG. 8 is a diagram of an example embodiment of a rack architecture to provide support for sleds featuring expansion capabilities.

FIG. 8 illustrates an example of a rack architecture 800 that may be representative of a rack architecture that may be implemented in order to provide support for sleds featuring expansion capabilities, such as sled 704 of FIG. 7. In the particular non-limiting example depicted in FIG. 8, rack architecture 800 includes seven sled spaces 803-1 to 803-7, which feature respective MPCMs 816-1 to 816-7. Sled spaces 803-1 to 803-7 include respective primary regions 803-1A to 803-7A and respective expansion regions 803-1B to 803-7B. With respect to each such sled space, when the corresponding MPCM is coupled with a counterpart MPCM of an inserted sled, the primary region may generally constitute a region of the sled space that physically accommodates the inserted sled. The expansion region may generally constitute a region of the sled space that can physically accommodate an expansion module, such as expansion sled 718 of FIG. 7, in the event that the inserted sled is configured with such a module.

Figure 9:
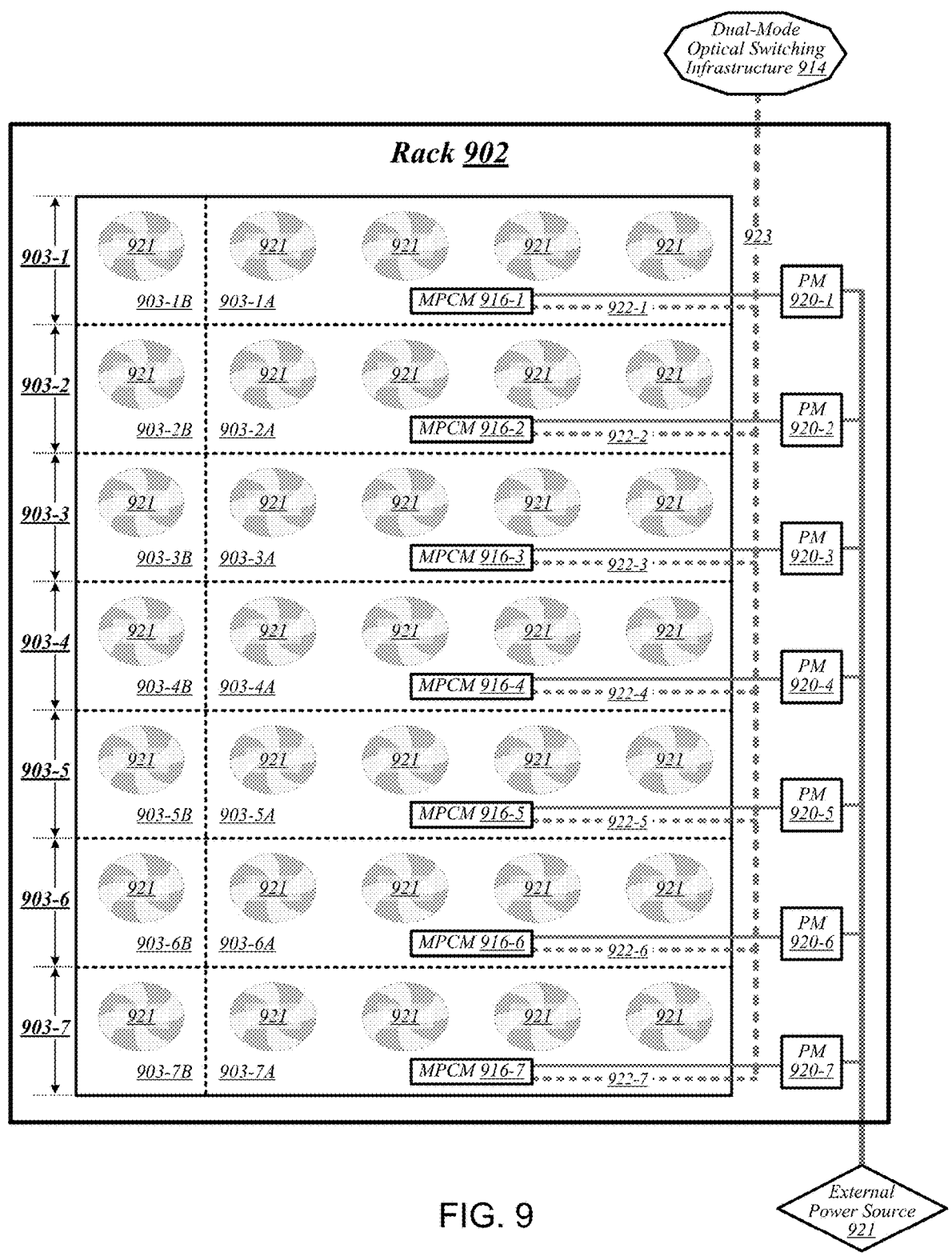
FIG. 9 is a diagram of an example embodiment of a rack implemented according to the rack architecture of FIG. 8.

FIG. 9 illustrates an example of a rack 902 that may be representative of a rack implemented according to rack architecture 800 of FIG. 8 according to some embodiments. In the particular non-limiting example depicted in FIG. 9, rack 902 features seven sled spaces 903-1 to 903-7, which include respective primary regions 903-1A to 903-7A and respective expansion regions 903-1B to 903-7B. In various embodiments, temperature control in rack 902 may be implemented using an air cooling system. For example, as reflected in FIG. 9, rack 902 may feature a plurality of fans 919 that are generally arranged to provide air cooling within the various sled spaces 903-1 to 903-7. In some embodiments, the height of the sled space is greater than the conventional "1 U" server height. In such embodiments, fans 919 may generally comprise relatively slow, large diameter cooling fans as compared to fans used in conventional rack configurations. Running larger diameter cooling fans at lower speeds may increase fan lifetime relative to smaller diameter cooling fans running at higher speeds while still providing the same amount of cooling. The sleds are physically shallower than conventional rack dimensions. Further, components are arranged on each sled to reduce thermal shadowing (i.e., not arranged serially in the direction of air flow). As a result, the wider, shallower sleds allow for an increase in device performance because the devices can be operated at a higher thermal envelope (e.g., 250 W) due to improved cooling (i.e., no thermal shadowing, more space between devices, more room for larger heat sinks, etc.).

MPCMs 916-1 to 916-7 may be configured to provide inserted sleds with access to power sourced by respective power modules 920-1 to 920-7, each of which may draw power from an external power source 921. In various embodiments, external power source 921 may deliver alternating current (AC) power to rack 902, and power modules 920-1 to 920-7 may be configured to convert such AC power to direct current (DC) power to be sourced to inserted sleds. In some embodiments, for example, power modules 920-1 to

920-7 may be configured to convert 277-volt AC power into 12-volt DC power for provision to inserted sleds via respective MPCMs 916-1 to 916-7. The embodiments are not limited to this example.

MPCMs 916-1 to 916-7 may also be arranged to provide inserted sleds with optical signaling connectivity to a dual-mode optical switching infrastructure 914, which may be the same as—or similar to—dual-mode optical switching infrastructure 514 of FIG. 5. In various embodiments, optical connectors contained in MPCMs 916-1 to 916-7 may be designed to couple with counterpart optical connectors contained in MPCMs of inserted sleds to provide such sleds with optical signaling connectivity to dual-mode optical switching infrastructure 914 via respective lengths of optical cabling 922-1 to 922-7. In some embodiments, each such length of optical cabling may extend from its corresponding MPCM to an optical interconnect loom 923 that is external to the sled spaces of rack 902. In various embodiments, optical interconnect loom 923 may be arranged to pass through a support post or other type of load-bearing element of rack 902. The embodiments are not limited in this context. Because inserted sleds connect to an optical switching infrastructure via MPCMs, the resources typically spent in manually configuring the rack cabling to accommodate a newly inserted sled can be saved.

Figure 10:
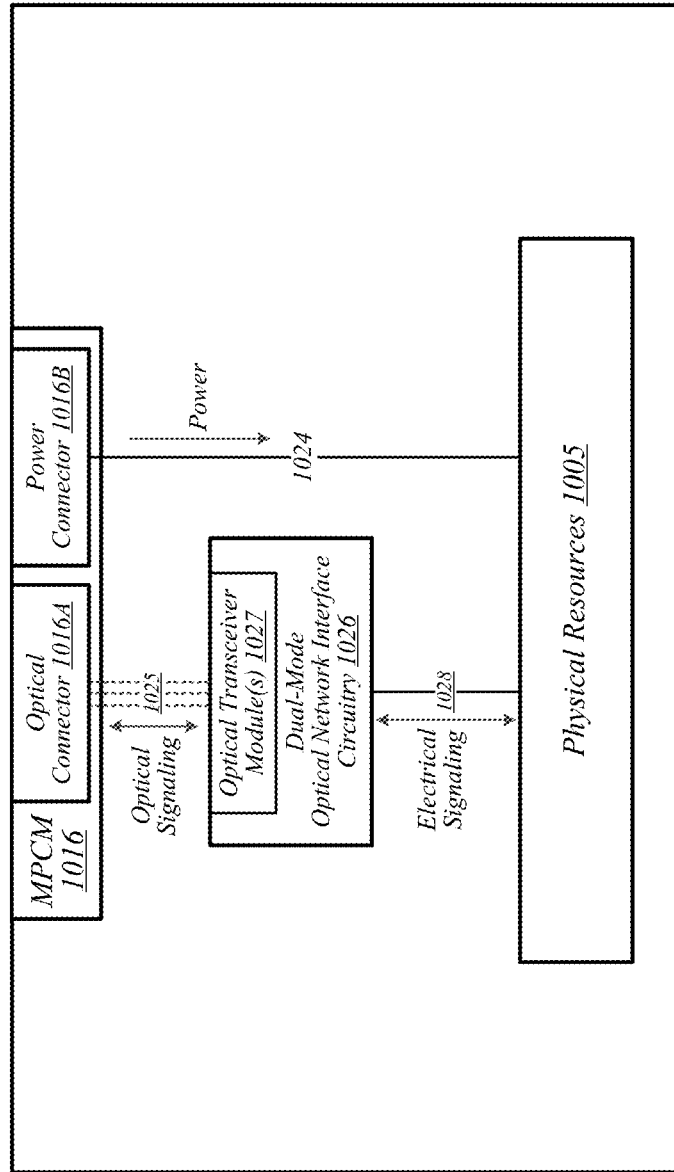
FIG. 10 is a diagram of an example embodiment of a sled designed for use in conjunction with the rack of FIG. 9.

FIG. 10 illustrates an example of a sled 1004 that may be representative of a sled designed for use in conjunction with rack 902 of FIG. 9 according to some embodiments. Sled 1004 may feature an MPCM 1016 that comprises an optical connector 1016A and a power connector 1016B, and that is designed to couple with a counterpart MPCM of a sled space in conjunction with insertion of MPCM 1016 into that sled space. Coupling MPCM 1016 with such a counterpart MPCM may cause power connector 1016 to couple with a power connector comprised in the counterpart MPCM. This may generally enable physical resources 1005 of sled 1004 to source power from an external source, via power connector 1016 and power transmission media 1024 that conductively couples power connector 1016 to physical resources 1005.

Sled 1004 may also include dual-mode optical network interface circuitry 1026. Dual-mode optical network interface circuitry 1026 may generally comprise circuitry that is capable of communicating over optical signaling media according to each of multiple link-layer protocols supported by dual-mode optical switching infrastructure 914 of FIG. 9. In some embodiments, dual-mode optical network interface circuitry 1026 may be capable both of Ethernet protocol communications and of communications according to a second, high-performance protocol. In various embodiments, dual-mode optical network interface circuitry 1026 may include one or more optical transceiver modules 1027, each of which may be capable of transmitting and receiving optical signals over each of one or more optical channels. The embodiments are not limited in this context.

Coupling MPCM 1016 with a counterpart MPCM of a sled space in a given rack may cause optical connector 1016A to couple with an optical connector comprised in the counterpart MPCM. This may generally establish optical connectivity between optical cabling of the sled and dual-mode optical network interface circuitry 1026, via each of a set of optical channels 1025. Dual-mode optical network interface circuitry 1026 may communicate with the physical resources 1005 of sled 1004 via electrical signaling media 1028. In addition to the dimensions of the sleds and arrangement of components on the sleds to provide improved cooling and enable operation at a relatively higher thermal envelope (e.g., 250 W), as described above with reference to FIG. 9, in some embodiments, a sled may include one or more additional features to facilitate air cooling, such as a heat pipe and/or heat sinks arranged to dissipate heat generated by physical resources 1005. It is worthy of note that although the example sled 1004 depicted in FIG. 10 does not feature an expansion connector, any given sled that features the design elements of sled 1004 may also feature an expansion connector according to some embodiments. The embodiments are not limited in this context.

Figure 11:
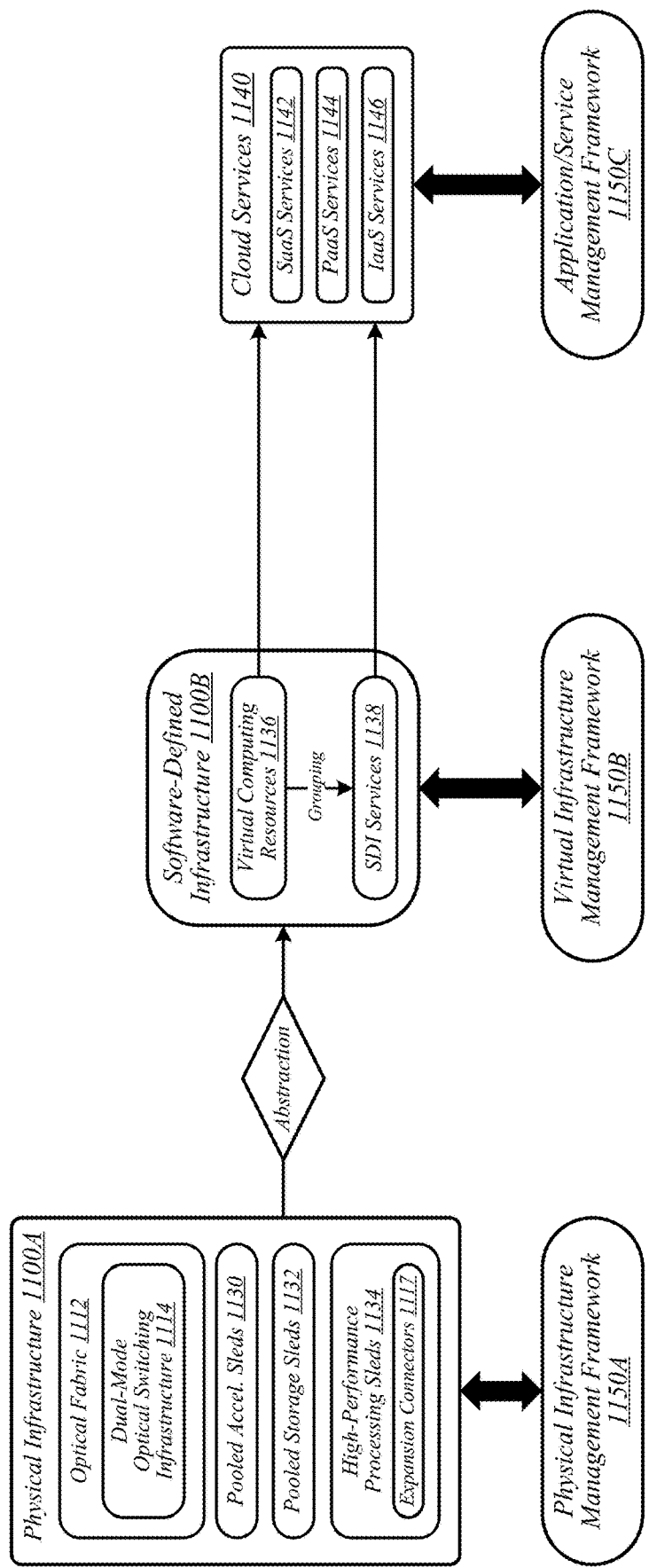
FIG. 11 is a diagram of an example embodiment of a data center in which one or more techniques described herein may be implemented according to various embodiments.

FIG. 11 illustrates an example of a data center 1100 that may generally be representative of one in/for which one or more techniques described herein may be implemented according to various embodiments. As reflected in FIG. 11, a physical infrastructure management framework 1150A may be implemented to facilitate management of a physical infrastructure 1100A of data center 1100. In various embodiments, one function of physical infrastructure management framework 1150A may be to manage automated maintenance functions within data center 1100, such as the use of robotic maintenance equipment to service computing equipment within physical infrastructure 1100A. In some embodiments, physical infrastructure 1100A may feature an advanced telemetry system that performs telemetry reporting that is sufficiently robust to support remote automated management of physical infrastructure 1100A. In various embodiments, telemetry information provided by such an advanced telemetry system may support features such as failure prediction/prevention capabilities and capacity planning capabilities. In some embodiments, physical infrastructure management framework 1150A may also be configured to manage authentication of physical infrastructure components using hardware attestation techniques. For example, robots may verify the authenticity of components before installation by analyzing information collected from a radio frequency identification (RFID) tag associated with each component to be installed. The embodiments are not limited in this context.

As shown in FIG. 11, the physical infrastructure 1100A of data center 1100 may comprise an optical fabric 1112, which may include a dual-mode optical switching infrastructure 1114. Optical fabric 1112 and dual-mode optical switching infrastructure 1114 may be the same as—or similar to—optical fabric 412 of FIG. 4 and dual-mode optical switching infrastructure 514 of FIG. 5, respectively, and may provide high-bandwidth, low-latency, multi-protocol connectivity among sleds of data center 1100. As discussed above, with reference to FIG. 1, in various embodiments, the availability of such connectivity may make it feasible to disaggregate and dynamically pool resources such as accelerators, memory, and storage. In some embodiments, for example, one or more pooled accelerator sleds 1130 may be included among the physical infrastructure 1100A of data center 1100, each of which may comprise a pool of accelerator resources—such as co-processors and/or FPGAs, for example—that is globally accessible to other sleds via optical fabric 1112 and dual-mode optical switching infrastructure 1114.

In another example, in various embodiments, one or more pooled storage sleds 1132 may be included among the physical infrastructure 1100A of data center 1100, each of which may comprise a pool of storage resources that is available globally accessible to other sleds via optical fabric 1112 and dual-mode optical switching infrastructure 1114. In some embodiments, such pooled storage sleds 1132 may comprise pools of solid-state storage devices such as solid-state drives (SSDs). In various embodiments, one or more high-performance processing sleds 1134 may be included among the physical infrastructure 1100A of data center 1100. In some embodiments, high-performance processing sleds 1134 may comprise pools of high-performance processors, as well as cooling features that enhance air cooling to yield a higher thermal envelope of up to 250 W or more. In various embodiments, any given high-performance processing sled 1134 may feature an expansion connector 1117 that can accept a far memory expansion sled, such that the far memory that is locally available to that high-performance processing sled 1134 is disaggregated from the processors and near memory comprised on that sled. In some embodiments, such a high-performance processing sled 1134 may be configured with far memory using an expansion sled that comprises low-latency SSD storage. The optical infrastructure allows for compute resources on one sled to utilize remote accelerator/FPGA, memory, and/or SSD resources that are disaggregated on a sled located on the same rack or any other rack in the data center. The remote resources can be located one switch jump away or two-switch jumps away in the spine-leaf network architecture described above with reference to FIG. 5. The embodiments are not limited in this context.

In various embodiments, one or more layers of abstraction may be applied to the physical resources of physical infrastructure 1100A in order to define a virtual infrastructure, such as a software-defined infrastructure 1100B. In some embodiments, virtual computing resources 1136 of software-defined infrastructure 1100B may be allocated to support the provision of cloud services 1140. In various embodiments, particular sets of virtual computing resources 1136 may be grouped for provision to cloud services 1140 in the form of SDI services 1138. Examples of cloud services 1140 may include—without limitation—software as a service (SaaS) services 1142, platform as a service (PaaS) services 1144, and infrastructure as a service (IaaS) services 1146.

In some embodiments, management of software-defined infrastructure 1100B may be conducted using a virtual infrastructure management framework 1150B. In various embodiments, virtual infrastructure management framework 1150B may be designed to implement workload fingerprinting techniques and/or machine-learning techniques in conjunction with managing allocation of virtual computing resources 1136 and/or SDI services 1138 to cloud services 1140. In some embodiments, virtual infrastructure management framework 1150B may use/consult telemetry data in conjunction with performing such resource allocation. In various embodiments, an application/service management framework 1150C may be implemented in order to provide quality of service (QoS) management capabilities for cloud services 1140. The embodiments are not limited in this context.

Figure 12:
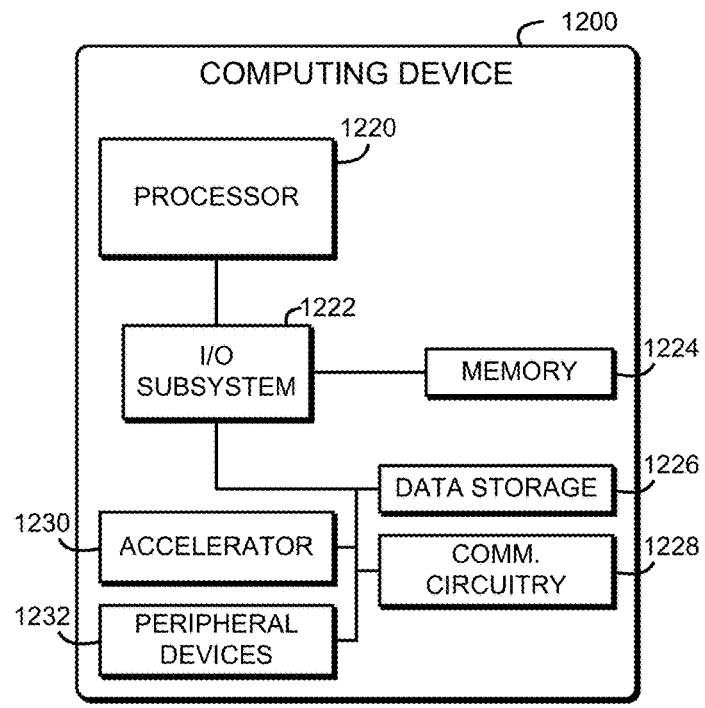
FIG. 12 is a simplified block diagram of at least one embodiment of a computing device for database acceleration.

Referring now to FIG. 12, an illustrative computing device 1200 for database acceleration includes a processor 1220, an input/output (I/O) subsystem 1222, a memory 1224, a data storage device 1226, and an accelerator 1230. The computing device 1200 may be embodied as server computer, a rack server, a blade server, a compute node, and/or a sled in a data center, such as a sled 204 as described above in connection with FIG. 2, a sled of the physical infrastructure 1100A as described above in connection with FIG. 11, or another sled of the data center.

In use, as described below, the computing device 1200 uses the accelerator 1230 to perform compression, decompression, and various filters on elements of a database. The computing device 1200 may store compressed databases, decompressed databases, modified databases, etc. to be accessed by the accelerator 1230. The accelerator 1230 may access data stored in an external memory device such as the main memory 1224 to perform the functions as described below. The data may include columns of elements, which may be embodied as packed arrays of unsigned integers. Each element is identified by an index, which may be an integer or other identifier. By accessing a compressed database with the accelerator 1230 and performing a decompression followed by one or more filters, the computing device 1200 eliminates the need to write a large amount of data associated with a decompressed database to memory 1224. That is, only the output of the data processing may be output to memory. This reduces the amount of memory and/or bandwidth that would have been required to perform the decompression, compression, filter, etc by having the accelerator 1230 perform these functions on the data. Accordingly, the computing device 1200 may improve memory utilization with accelerator 1230, particularly for multi-tenant computing devices 1200, such as devices in a data center. Of course, by using the accelerator 1230, the computing device 1200 may also improve performance over software-only implementations.

The processor 1220 may be embodied as any type of processor capable of performing the functions described herein. For example, the processor 1220 may be embodied as a single or multi-core processor(s), digital signal processor, microcontroller, or other processor or processing/controlling circuit. Similarly, the memory 1224 may be embodied as any type of volatile or non-volatile memory or data storage capable of performing the functions described herein. In operation, the memory 1224 may store various data and software used during operation of the computing device 1200 such operating systems, applications, programs, libraries, and drivers. The memory 1224 is communicatively coupled to the processor 1220 via the I/O subsystem 1222, which may be embodied as circuitry and/or components to facilitate input/output operations with the processor 1220, the memory 1224, and other components of the computing device 1200. For example, the I/O subsystem 1222 may be embodied as, or otherwise include, memory controller hubs, input/output control hubs, sensor hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 1222 may form a portion of a system-on-a-chip (SoC) and be incorporated, along with the processor 1220, the memory 1224, and other components of the computing device 1200, on a single integrated circuit chip.

The data storage device 1226 may be embodied as any type of device or devices configured for short-term or long-term storage of data such as, for example, memory devices and circuits, memory cards, hard disk drives, solid-state drives, non-volatile flash memory, or other data storage devices. The computing device 1200 may also include a communications subsystem 1228, which may be embodied as any communication circuit, device, or collection thereof, capable of enabling communications between the computing device 1200 and other remote devices over a computer network (not shown). The communications subsystem 1228 may be configured to use any one or more communication technology (e.g., wired or wireless communications) and associated protocols (e.g., Ethernet, InfiniBand®, Bluetooth®, Wi-Fi®, WiMAX, 3G, 4G LTE, etc.) to effect such communication.

As shown in FIG. 12, the computing device 1200 includes an accelerator 1230. The accelerator 1230 may be embodied as may be embodied as any coprocessor, application-specific integrated circuit (ASIC), field-programmable gate array (FPGA), functional block, IP core, or other hardware accelerator of the computing device 1200 capable of performing the functions described herein. The accelerator 1230 may be coupled to the processor 1220 via a high-speed connection interface such as a peripheral bus (e.g., a PCI Express bus) or an inter-processor interconnect (e.g., an in-die interconnect (IDI) or QuickPath Interconnect (QPI)), via a fabric interconnect such as Intel® Omni-Path Architecture, or via any other appropriate interconnect. Additionally, although illustrated in FIG. 12 as a discrete component separate from the processor 1220 and/or the I/O subsystem 1222, it should be understood that in some embodiments the accelerator 1230, the processor 1220, the I/O subsystem 1222, and/or the memory 1224 may be incorporated in the same package and/or in the same computer chip, for example in the same SoC. In some embodiments, the accelerator 1230 may be incorporated as part of a network interface controller (NIC) of the computing device 1200 and/or included in the same multi-chip package as the NIC. In some embodiments, the accelerator 1230 may be incorporated as part of the I/O subsystem 1222 (e.g., as part of a memory controller).

The computing device 1200 may further include one or more peripheral devices 1232. The peripheral devices 1232 may include any number of additional input/output devices, interface devices, hardware accelerators, and/or other peripheral devices. For example, in some embodiments, the peripheral devices 1232 may include a touch screen, graphics circuitry, a graphical processing unit (GPU) and/or processor graphics, an audio device, a microphone, a camera, a keyboard, a mouse, a network interface, and/or other input/output devices, interface devices, and/or peripheral devices.

Figure 13:
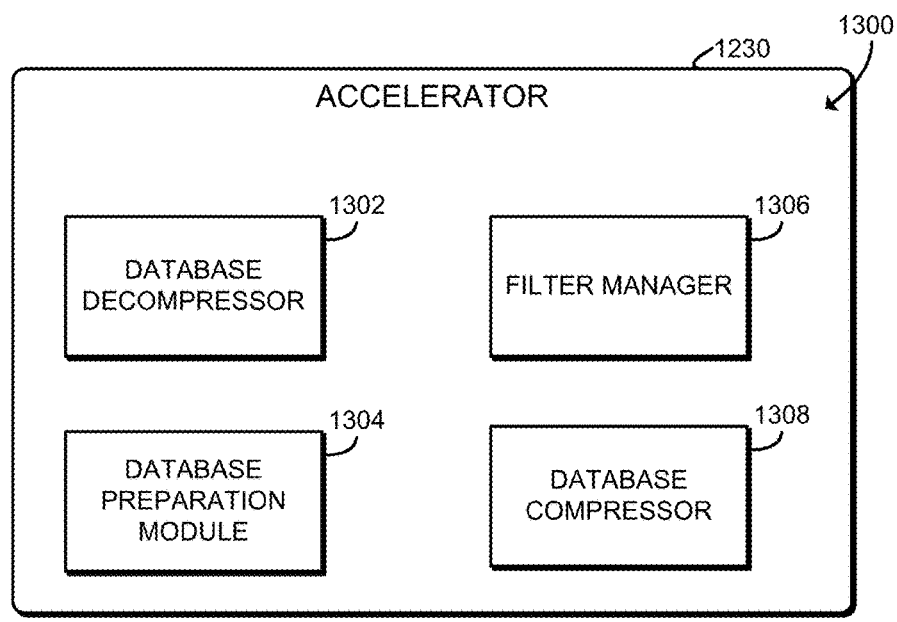
FIG. 13 is a simplified block diagram of at least one embodiment of an environment that may be established by an accelerator of the computing device of FIG. 12.

Referring now to FIG. 13, in an illustrative embodiment, the accelerator 1230 establishes an environment 1300 during operation. The illustrative environment 1300 includes a database compressor 1302, a database preparation module 1304, a filter manager 1306 and a database compressor 1308. The various components of the environment 1300 may be embodied as hardware, firmware, software, or a combination thereof. As such, in some embodiments, one or more of the components of the environment 1300 may be embodied as circuitry or collection of electrical devices (e.g., database compressor circuitry 1302, database preparation circuitry 1304, filter manager circuitry 1306, and/or database compressor circuitry 1308). It should be appreciated that, in such embodiments, one or more of the database compressor circuitry 1302, the database preparation circuitry 1304, the filter manager circuitry 1306, and/or the database compressor circuitry 1308 may form a portion of the processor 1220, the I/O subsystem 1222, the accelerator 1230, and/or other components of the computing device 1200. Additionally, in some embodiments, one or more of the illustrative components may form a portion of another component and/or one or more of the illustrative components may be independent of one another.

The database decompressor 1302 is configured to retrieve a compressed database from storage 1226 or memory 1224 and perform a decompression of the one or more compressed elements of the compressed elements. The result generates a decompressed database that includes the decompressed elements. These elements may be stored in a columnar format or any other format suitable for a database to be manipulated. Each element may be identified by an index as described above. The index may be referenced for an output of the element. For example, if the accelerator 1230 is performing a determination of which values of the database are above a threshold value, the output may contain the index of each element that is above the threshold.

The database preparation module 1304 is configured to prepare the elements of the database for a filter operation. To do so, the database preparation module 1304 manipulates the decompressed elements from the database decompressor 1302 to a target format to be processed by the filter operation. For example, the database preparation module 1304 may perform bit manipulations such as data re-alignment, bit re-mapping, bit broadcasting, or other modifications. The data preparation may depend on specific database attributes such as data element sizes and/or database filter operations. Additionally, in some embodiments, the database preparation module 1304 may manipulate data elements directly from the source, without decompression. The database preparation module 1304 may also prepare the output elements from the filter operation. The database preparation module 1304 may expand or decrease the bit width of each element or convert the elements into an array of indices. The elements may include a bit vector and each index of the array of indices corresponds to a set bit in the bit vector.

The filter manager 1306 is configured to manage the various filter operations the accelerator 1230 may perform on the database elements. The filter operations may include one or more operations performed in connection with a database query. The filter manager 1306 may perform a filter operation such as an extract, a bitwise logic operation, a scan, a generate, a translate, an aggregate, a sort, or a set membership or any combination of those operations after preparation of the database elements to the target format. In some embodiments, the filter operations may include other filters that may be performed on a database. The filter manager 1306 may also subsequently perform another filter operation after performing a first filter operation. For example, to perform an aggregate, the filter manager 1306 may aggregate the output elements to generate aggregate data which may include computing a population count, a minimum, or a maximum.

The database compressor 1308 is configured to compress the output of the filter manager 1306 to generate compressed elements of a compressed database, which may reduce the amount of data written to memory 1224. In some embodiments, the database compressor 1308 may perform compression after performing the filter operation with the filter manager 1306 or after a series of filter operations with the filter manager 1306. The compression algorithm used may or may not be the same algorithm used to decompress the data. The compression algorithm may be data or operation specific (e.g., implied or expressly configured). After compression of the output elements, the accelerator 1230 may write the compressed output to memory 1224. Alternatively, the accelerator 1230 may write the output to memory 1224 without compressing the output.

Figure 14:
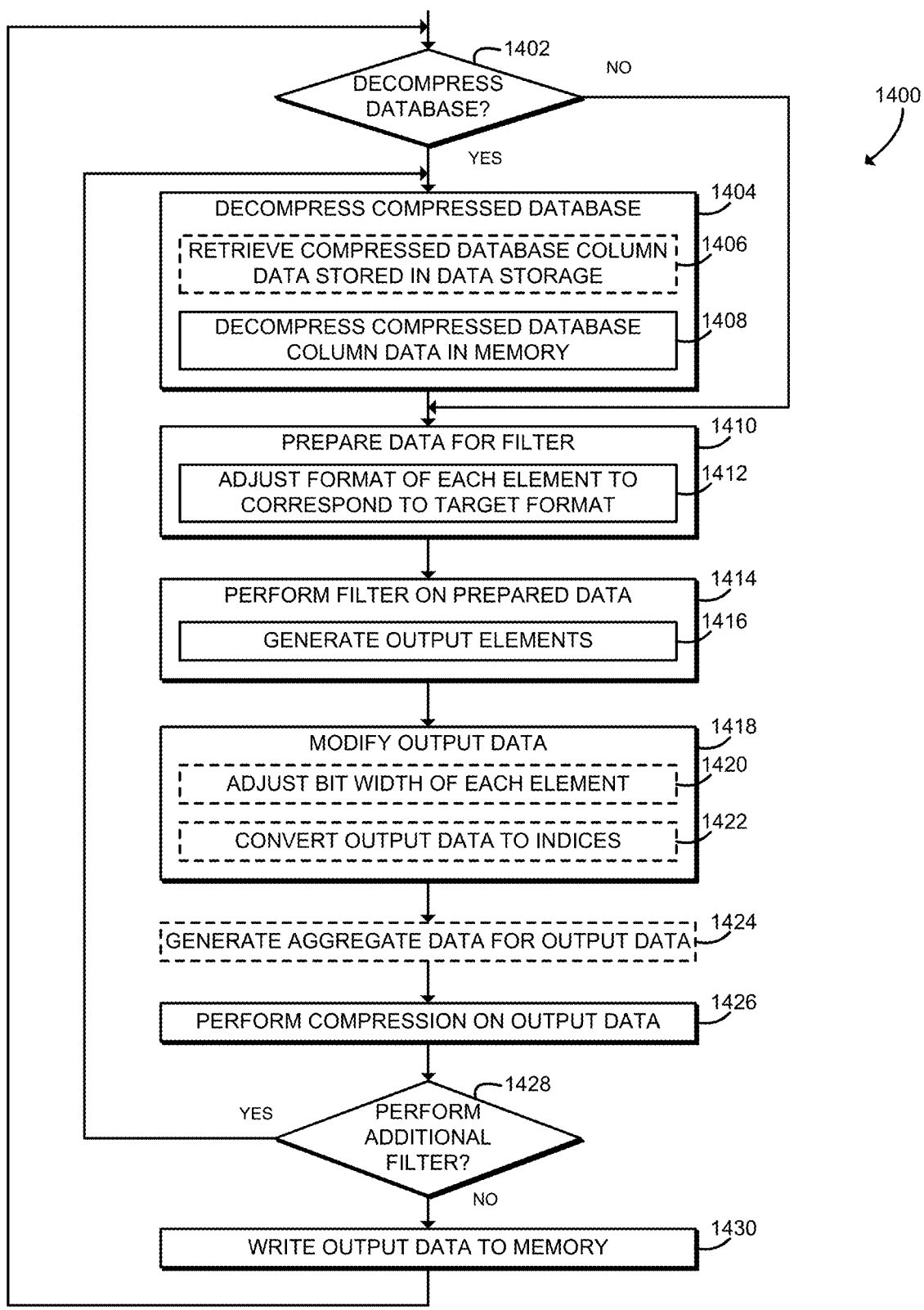
FIG. 14 is a simplified flow diagram of at least one embodiment of a method for database acceleration that may be executed by the computing device of FIGS. 12-13.

Referring now to FIG. 14, in use, the computing device 1200 may execute a method 1400 for database acceleration. It should be appreciated that, in some embodiments, the operations of the method 1400 may be performed by one or more components of the environment 1300 of the accelerator 1230 of the computing device 1200 as shown in FIG. 13. The method 1400 begins in block 1402, in which the accelerator 1230 determines whether to decompress a database in memory 1224 or in storage 1226. This may be determined based on whether there is a compressed database in memory 1224 or in storage 1226 that needs to be processed by a filter operation. If the accelerator 1230 determines that decompression is not necessary (e.g., the database in the memory 1224 is not compressed), then the method 1400 branches ahead to block 1410, described below. If the accelerator 1230 determines to decompress the database, the method 1400 advances to block 1404.

In block 1404, the accelerator 1230 decompresses the compressed database. The compressed database may be stored in any lossless compression format, including dictionary encoding, run-length encoding (RLE), or an LZ77-based algorithm such as DEFLATE. In the illustrative embodiment, the database column data is compressed using DEFLATE, and is decompressed by the accelerated hardware function of the accelerator 1230. To decompress the database, in some embodiments, the accelerator 1230 may retrieve compressed database column data that is stored in a data storage 1226 in block 1406. After the compressed database column data is in memory 1224, the accelerator 1230 performs a decompression on the compressed database column data to generate decompressed elements in block 1408. The decompressed elements may be embodied as a packed array of n-bit unsigned integers, wherein the width of the integers may depend on the database column, schema, or other data definition. The input data may be organized in big-endian or little-endian format. As a special case where n=1, the input data may be embodied as a bit vector.

After decompressing the data, the accelerator 1230 prepares the data from the decompression for a filter operation in block 1410. In block 1412, the accelerator 1230 may adjust the format of each element to correspond to a target format for a specified filter operation. For example, the accelerator may expand or decrease the bit width of each element or convert the elements into an array of indices. Each filter operation may specify what format it requires each element to be in to be processed by that filter operation. The accelerator 1230 may format the elements based on those specifications.

In block 1414, the accelerator 1230 performs a filter on the prepared data. The filters may include common operations typically performed during a database query. For example, the filter may be embodied as an extract, a bitwise logic operation, a scan, a generate, a translate, an aggregate, a sort, or a set membership. In some embodiments, the filters may perform operations in hardware that are inefficient or otherwise slow to perform in software using the processor 1200, leaving other operations to the processor 1200. Certain filters may require two or more input streams of data elements. In some embodiments, when the accelerator 1230 processes two input streams, the decompression engine of the accelerator 1230 must be bypassed (i.e., the column data may not be compressed), and one of the two input streams must be a bit vector. In those embodiments, the decompression and the filtering may be performed in separate passes, for example using an intermediate memory buffer. Of course, in other embodiments the accelerator 1230 may not have any restrictions on the composition of the input data streams. For example, in some embodiments, each input stream may be decompressed or not independent of the other stream, and in some embodiments multiple input streams may be used that are not bit vectors.

In block 1416, the accelerator 1230 generates output elements from performing the filter in block 1414. The output elements may be embodied as a bit vector and/or a packed array of data elements similar to the input data. The output data may have a different bit width and/or a different number of elements as compared to the input data. For example, the extract filter may perform width conversion for the data elements or pad the data elements. As another example, the bitwise logic operation may perform a bitwise logic operation (e.g., AND, OR, XOR) on each element of two streams of input data elements. The scan element may compare elements against a lower bound and an upper bound and output a bit vector. Thus, with careful selection of bounds the scan filter may be used to perform equality, inequality, and mathematical comparison operations. The generate filter may be used to generate a column of constant and/or random data. The sort filter may generate a sorted list of data elements.

After generating the output elements, the accelerator 1230 may modify the output data in block 1418. To modify the output data, in some embodiments, the accelerator 1230 adjusts the bit width of each element in block 1420. For example, the accelerator 1230 may add leading zeroes to each element. In addition, in some embodiments, the accelerator 1230 may convert the output data to indices in block 1422. For example, this may include outputting an array of indices corresponding to data elements that satisfy a specified condition.

In some embodiments, after modifying the output data, in block 1424, the accelerator 1230 generates aggregate data for the output data. This may include computing a population count, a minimum, or a maximum of the output data. The population count may be embodied as the number of non-zero bits in a bit vector. The accelerator 1230 may also identify the index of the first and last set bit in the bit vector. In some embodiments, some or all of the output data may be suppressed. For example, when generating the population count, the accelerator 1230 may suppress the bit vector and output only the population count.

In block 1426, the accelerator 1230 may perform compression on the output data. After performing compression, the accelerator 1230 determines whether to perform an additional filter in block 1428. If the accelerator 1230 determines that another filter needs to be performed, the method 1400 returns to block 1404 to continue processing the data. If the accelerator 1230 determines that another filter is not needed, the method 1400 advances to block 1430, in which the accelerator 1230 writes the output data, which may be compressed, to the memory 1224. After writing the output data, the method 1400 loops back to block 1402 to continue performing database operations.

EXAMPLES

Illustrative examples of the technologies disclosed herein are provided below. An embodiment of the technologies may include any one or more, and any combination of, the examples described below.

Example 1 includes a computing device for database acceleration, the computing device comprising a database accelerator, wherein the database accelerator comprises: a database decompressor to decompress one or more compressed elements of a compressed database to generate one or more decompressed elements; a database preparation module to prepare the one or more decompressed elements to generate one or more prepared elements to be processed by an accelerated filter; and a filter manager to perform the accelerated filter on the one or more prepared elements to generate one or more output elements.

Example 2 includes the subject matter of Example 1, and wherein the one or more compressed elements of the compressed database are stored in a columnar format.

Example 3 includes the subject matter of any of Examples 1 and 2, and wherein to prepare the one or more decompressed elements comprises to format each of the one or more decompressed elements to a target format that is compatible with the accelerated filter.

Example 4 includes the subject matter of any of Examples 1-3, and further comprising a database compressor to compress the output elements to generate compressed output elements, wherein the computing device writes the compressed output elements to memory in response to compression of the output elements.

Example 5 includes the subject matter of any of Examples 1-4, and wherein to perform the accelerated filter on the one or more prepared elements comprises to perform an extract, a bitwise logic operation, a scan, a generate, a translate, an aggregate, a sort, or a set membership.

Example 6 includes the subject matter of any of Examples 1-5, and wherein to perform the accelerated filter with the database accelerator comprises to perform the accelerated filter with a field programmable gate array.

Example 7 includes the subject matter of any of Examples 1-6, and wherein to perform the accelerated filter with the database accelerator comprises to perform the accelerated filter with an application-specific integrated circuit.

Example 8 includes the subject matter of any of Examples 1-7, and wherein the filter manager is to perform a second accelerated filter on the one or more output elements in response to performance of the accelerated filter on the one or more prepared elements.

Example 9 includes the subject matter of any of Examples 1-8, and wherein the database preparation module is further to prepare the output elements for a target format that is compatible with the second accelerated filter in response to performance of the accelerated filter, wherein performance of the second accelerated filter comprises to perform the second accelerated filter in response to preparation of the output elements.

Example 10 includes the subject matter of any of Examples 1-9, and wherein the filter manager is further to aggregate the output elements to generate aggregate data.

Example 11 includes the subject matter of any of Examples 1-10, and wherein to aggregate the output elements comprises to compute a population count, a minimum, a maximum, or a summation.

Example 12 includes the subject matter of any of Examples 1-11, and wherein to aggregate the output elements comprises to perform an arithmetic operation or a statistical operation on the output elements.

Example 13 includes the subject matter of any of Examples 1-12, and wherein: each of the decompressed elements comprises an unsigned integer and the one or more decompressed elements comprises a packed array of the decompressed elements; and each of the output elements comprises an unsigned integer and the one or more output elements comprises a packed array of the output elements.

Example 14 includes the subject matter of any of Examples 1-13, and wherein the database preparation module is further to modify the one or more output elements in response to performance of the accelerated filter.

Example 15 includes the subject matter of any of Examples 1-14, and wherein to modify the one or more output elements comprises to expand a bit width of each output element, truncate a bit width of each output element, append a value to each output element, or pre-pend a value to each output element.

Example 16 includes the subject matter of any of Examples 1-15, and wherein to modify the one or more output elements comprises to convert the one or more output elements to an array of indices, wherein the one or more output elements comprises a bit vector, and wherein each index of the array of indices corresponds to a set bit in the bit vector.

Example 17 includes a method for database acceleration, the method comprising: decompressing, by a database accelerator of a computing device, one or more compressed elements of a compressed database to generate one or more decompressed elements; preparing, by the database accelerator, the one or more decompressed elements to generate one or more prepared elements for processing by an accelerated filter; and performing, by the database accelerator, the accelerated filter on the one or more prepared elements to generate one or more output elements.

Example 18 includes the subject matter of Example 17, and wherein the one or more compressed elements of the compressed database are stored in a columnar format.

Example 19 includes the subject matter of any of Examples 17 and 18, and wherein preparing the one or more decompressed elements comprises formatting each of the one or more decompressed elements to a target format that is compatible with the accelerated filter.

Example 20 includes the subject matter of any of Examples 17-19, and further comprising: compressing, by the database accelerator, the output elements to generate compressed output elements; and writing, by the database accelerator, the compressed output elements to memory in response to compressing the output elements.

Example 21 includes the subject matter of any of Examples 17-20, and wherein performing the accelerated filter on the one or more prepared elements comprises performing an extract, a bitwise logic operation, a scan, a generate, a translate, an aggregate, a sort, or a set membership.

Example 22 includes the subject matter of any of Examples 17-21, and wherein performing the accelerated filter with the database accelerator comprises performing the accelerated filter with a field programmable gate array.

Example 23 includes the subject matter of any of Examples 17-22, and wherein performing the accelerated filter with the database accelerator comprises performing the accelerated filter with an application-specific integrated circuit.

Example 24 includes the subject matter of any of Examples 17-23, and further comprising performing, by the database accelerator, a second accelerated filter on the one or more output elements in response to performing the accelerated filter on the one or more prepared elements.

Example 25 includes the subject matter of any of Examples 17-24, and further comprising: preparing, by the database accelerator, the output elements for a target format that is compatible with the second accelerated filter in response to performing the accelerated filter; wherein performing the second accelerated filter comprises performing the second accelerated filter in response to preparing the output elements.

Example 26 includes the subject matter of any of Examples 17-25, and further comprising aggregating, by the database accelerator, the output elements to generate aggregate data.

Example 27 includes the subject matter of any of Examples 17-26, and wherein aggregating the output elements comprises computing a population count, a minimum, a maximum, or a summation.

Example 28 includes the subject matter of any of Examples 17-27, and wherein aggregating the output elements comprises performing an arithmetic operation or a statistical operation on the output elements.

Example 29 includes the subject matter of any of Examples 17-28, and wherein: each of the decompressed elements comprises an unsigned integer and the one or more decompressed elements comprises a packed array of the decompressed elements; and each of the output elements comprises an unsigned integer and the one or more output elements comprises a packed array of the output elements.

Example 30 includes the subject matter of any of Examples 17-29, and further comprising modifying the one or more output elements in response to performing the accelerated filter.

Example 31 includes the subject matter of any of Examples 17-30, and wherein modifying the one or more output elements comprises expanding a bit width of each output element, truncating a bit width of each output element, appending a value to each output element, or pre-pending a value to each output element.

Example 32 includes the subject matter of any of Examples 17-31, and wherein modifying the one or more output elements comprises converting the one or more output elements to an array of indices, wherein the one or more output elements comprises a bit vector, and wherein each index of the array of indices corresponds to a set bit in the bit vector.

Example 33 includes a computing device comprising: a processor; and a memory having stored therein a plurality of instructions that when executed by the processor cause the computing device to perform the method of any of Examples 17-32.

Example 34 includes one or more non-transitory, computer readable storage media comprising a plurality of instructions stored thereon that in response to being executed result in a computing device performing the method of any of Examples 17-32.

Example 35 includes a computing device comprising means for performing the method of any of Examples 17-32.

Example 36 includes a computing device for database acceleration, the computing device comprising: means for decompressing, by a database accelerator of the computing device, one or more compressed elements of a compressed database to generate one or more decompressed elements; means for preparing, by the database accelerator, the one or more decompressed elements to generate one or more prepared elements for processing by an accelerated filter; and means for performing, by the database accelerator, the accelerated filter on the one or more prepared elements to generate one or more output elements.

Example 37 includes the subject matter of Example 36, and wherein the one or more compressed elements of the compressed database are stored in a columnar format.

Example 38 includes the subject matter of any of Examples 36 and 37, and wherein the means for preparing the one or more decompressed elements comprises means for formatting each of the one or more decompressed elements to a target format that is compatible with the accelerated filter.

Example 39 includes the subject matter of any of Examples 36-38, and further comprising: means for compressing, by the database accelerator, the output elements to generate compressed output elements; and means for writing, by the database accelerator, the compressed output elements to memory in response to compressing the output elements.

Example 40 includes the subject matter of any of Examples 36-39, and wherein the means for performing the accelerated filter on the one or more prepared elements comprises means for performing an extract, a bitwise logic operation, a scan, a generate, a translate, an aggregate, a sort, or a set membership.

Example 41 includes the subject matter of any of Examples 36-40, and wherein the means for performing the accelerated filter with the database accelerator comprises means for performing the accelerated filter with a field programmable gate array.

Example 42 includes the subject matter of any of Examples 36-41, and wherein the means for performing the accelerated filter with the database accelerator comprises means for performing the accelerated filter with an application-specific integrated circuit.

Example 43 includes the subject matter of any of Examples 36-42, and further comprising means for performing, by the database accelerator, a second accelerated filter on the one or more output elements in response to performing the accelerated filter on the one or more prepared elements.

Example 44 includes the subject matter of any of Examples 36-43, and further comprising: means for preparing, by the database accelerator, the output elements for a target format that is compatible with the second accelerated filter in response to performing the accelerated filter; wherein the means for performing the second accelerated filter comprises means for performing the second accelerated filter in response to preparing the output elements.

Example 45 includes the subject matter of any of Examples 36-44, and further comprising means for aggregating, by the database accelerator, the output elements to generate aggregate data.

Example 46 includes the subject matter of any of Examples 36-45, and wherein the means for aggregating the output elements comprises means for computing a population count, a minimum, a maximum, or a summation.

Example 47 includes the subject matter of any of Examples 36-46, and wherein the means for aggregating the output elements comprises means for performing an arithmetic operation or a statistical operation on the output elements.

Example 48 includes the subject matter of any of Examples 36-47, and wherein: each of the decompressed elements comprises an unsigned integer and the one or more decompressed elements comprises a packed array of the decompressed elements; and each of the output elements comprises an unsigned integer and the one or more output elements comprises a packed array of the output elements.

Example 49 includes the subject matter of any of Examples 36-48, and further comprising means for modifying the one or more output elements in response to performing the accelerated filter.

Example 50 includes the subject matter of any of Examples 36-49, and wherein the means for modifying the one or more output elements comprises means for expanding a bit width of each output element, truncating a bit width of each output element, appending a value to each output element, or pre-pending a value to each output element.

Example 51 includes the subject matter of any of Examples 36-50, and wherein the means for modifying the one or more output elements comprises means for converting the one or more output elements to an array of indices, wherein the one or more output elements comprises a bit vector, and wherein each index of the array of indices corresponds to a set bit in the bit vector.

The invention claimed is:

1. A computing device for database acceleration, the computing device comprising a memory and a database accelerator, wherein the database accelerator comprises:
   a database decompressor to (i) read one or more compressed elements of a column of a compressed database and (ii) decompress the one or more compressed elements of the column of the compressed database to generate one or more decompressed elements of the column of the compressed database;
   a database preparation module to prepare the one or more decompressed elements to generate one or more prepared elements to be processed by an accelerated filter, wherein the one or more prepared elements correspond to a target format of the accelerated filter; and
   a filter manager to perform the accelerated filter on the one or more prepared elements to generate one or more output elements;
   wherein the database accelerator is to write the one or more output elements to the memory in response to performance of the accelerated filter.

2. The computing device of claim 1, wherein to prepare the one or more decompressed elements comprises to format each of the one or more decompressed elements to a target format that is compatible with the accelerated filter.

3. The computing device of claim 1, wherein the database accelerator further comprises a database compressor to compress the output elements to generate compressed output elements, wherein to write the one or more output elements comprises to write the compressed output elements to the memory in response to compression of the output elements.

4. The computing device of claim 1, wherein to perform the accelerated filter on the one or more prepared elements comprises to perform an extract, a bitwise logic operation, a scan, a generate, a translate, an aggregate, a sort, or a set membership.

5. The computing device of claim 1, wherein to perform the accelerated filter with the database accelerator comprises to perform the accelerated filter with a field programmable gate array.

6. The computing device of claim 1, wherein to perform the accelerated filter with the database accelerator comprises to perform the accelerated filter with an application-specific integrated circuit.

7. The computing device of claim 1, wherein the filter manager is further to aggregate the output elements to generate aggregate data.

8. The computing device of claim 7, wherein to aggregate the output elements comprises to compute a population count, a minimum, a maximum, or a summation.

9. The computing device of claim 7, wherein to aggregate the output elements comprises to perform an arithmetic operation or a statistical operation on the output elements.

10. The computing device of claim 1, wherein:
    each of the decompressed elements comprises an unsigned integer and the one or more decompressed elements comprises a packed array of the decompressed elements; and
    each of the output elements comprises an unsigned integer and the one or more output elements comprises a packed array of the output elements.

11. The computing device of claim 10, wherein the database preparation module is further to modify the one or more output elements in response to performance of the accelerated filter.

12. The computing device of claim 11, wherein to modify the one or more output elements comprises to expand a bit width of each output element, truncate a bit width of each output element, append a value to each output element, or pre-pend a value to each output element.

13. The computing device of claim 11, wherein to modify the one or more output elements comprises to convert the one or more output elements to an array of indices, wherein the one or more output elements comprises a bit vector, and wherein each index of the array of indices corresponds to a set bit in the bit vector.

14. A method for database acceleration, the method comprising:
    reading, by a database accelerator of a computing device, one or more compressed elements of a column of a compressed database;
    decompressing, by the database accelerator, the one or more compressed elements of the column of the compressed database to generate one or more decompressed elements of the column of the compressed database;
    preparing, by the database accelerator, the one or more decompressed elements to generate one or more prepared elements for processing by an accelerated filter, wherein the one or more prepared elements correspond to a target format of the accelerated filter;
    performing, by the database accelerator, the accelerated filter on the one or more prepared elements to generate one or more output elements; and
    writing, by the database accelerator, the one or more output elements to a memory of the computing device in response to performing the accelerated filter.

15. The method of claim 14, wherein preparing the one or more decompressed elements comprises formatting each of the one or more decompressed elements to a target format that is compatible with the accelerated filter.

16. The method of claim 14, further comprising:
    compressing, by the database accelerator, the output elements to generate compressed output elements;
    wherein writing the one or more output elements comprises writing, by the database accelerator, the compressed output elements to the memory in response to compressing the output elements.

17. The method of claim 14, further comprising aggregating, by the database accelerator, the output elements to generate aggregate data.

18. The method of claim 14, wherein:
    each of the decompressed elements comprises an unsigned integer and the one or more decompressed elements comprises a packed array of the decompressed elements; and
    each of the output elements comprises an unsigned integer and the one or more output elements comprises a packed array of the output elements.

19. The method of claim 18, further comprising modifying the one or more output elements in response to performing the accelerated filter.

20. One or more computer-readable storage media comprising a plurality of instructions stored thereon that, in response to being executed, cause a computing device to:
    read, by a database accelerator of a computing device, one or more compressed elements of a column of a compressed database;
    decompress, by the database accelerator, one or more compressed elements of the column of the compressed database to generate one or more decompressed elements of the column of the compressed database;
    prepare, by the database accelerator, the one or more decompressed elements to generate one or more prepared elements for processing by an accelerated filter, wherein the one or more prepared elements correspond to a target format of the accelerated filter;

perform, by the database accelerator, the accelerated filter on the one or more prepared elements to generate one or more output elements; and write, by the database accelerator, the one or more output elements to a memory of the computing device in response to performing the accelerated filter.

21. The one or more computer-readable storage media of claim 20, wherein to prepare the one or more decompressed elements comprises to format each of the one or more decompressed elements to a target format that is compatible with the accelerated filter.

22. The one or more computer-readable storage media of claim 20, further comprising a plurality of instructions stored thereon that, in response to being executed, cause the computing device to:

compress, by the database accelerator, the output elements to generate compressed output elements;

wherein to write the one or more output elements comprises to write, by the database accelerator, the compressed output elements to memory in response to compressing the output elements.

23. The one or more computer-readable storage media of claim 20, further comprising a plurality of instructions stored thereon that, in response to being executed, cause the computing device to aggregate, by the database accelerator, the output elements to generate aggregate data.

24. The one or more computer-readable storage media of claim 20, wherein:

each of the decompressed elements comprises an unsigned integer and the one or more decompressed elements comprises a packed array of the decompressed elements; and each of the output elements comprises an unsigned integer and the one or more output elements comprises a packed array of the output elements.

25. The one or more computer-readable storage media of claim 24, further comprising a plurality of instructions stored thereon that, in response to being executed, cause the computing device to modify the one or more output elements in response to performing the accelerated filter.

\* \* \* \* \*